United States Patent
Stocker

(10) Patent No.: US 8,306,051 B2
(45) Date of Patent: Nov. 6, 2012

(54) COMMUNICATION PROTOCOL FOR A LIGHTING CONTROL SYSTEM

(75) Inventor: R. Paul Stocker, Bethlehem, PA (US)

(73) Assignee: Lutron Electronics Co., Inc., Coopersburg, PA (US)

(*) Notice: Subject to any disclaimer, the term of this patent is extended or adjusted under 35 U.S.C. 154(b) by 1583 days.

(21) Appl. No.: 11/672,884

(22) Filed: Feb. 8, 2007

(65) Prior Publication Data

US 2008/0191837 A1    Aug. 14, 2008

(51) Int. Cl.
*H04L 12/42* (2006.01)

(52) U.S. Cl. ........................................................ 370/449

(58) Field of Classification Search .............. 370/346, 370/449–463; 340/3.51–3.53
See application file for complete search history.

(56) References Cited

U.S. PATENT DOCUMENTS

| | | | |
|---|---|---|---|
| 4,100,533 A * | 7/1978 | Napolitano et al. | 340/9.1 |
| 4,829,297 A * | 5/1989 | Ilg et al. | 370/449 |
| 5,191,265 A | 3/1993 | D'Aleo et al. | |
| 5,463,286 A | 10/1995 | D'Aleo et al. | |
| 5,530,322 A | 6/1996 | Ference et al. | |
| 5,736,965 A | 4/1998 | Mosebrook et al. | |
| 5,838,226 A | 11/1998 | Houggy et al. | |
| 5,848,054 A | 12/1998 | Mosebrook et al. | |
| 5,905,442 A | 5/1999 | Mosebrook et al. | |
| 5,949,200 A | 9/1999 | Ference et al. | |
| 5,982,103 A | 11/1999 | Mosebrook et al. | |
| 5,990,635 A | 11/1999 | Ference et al. | |
| 6,046,550 A | 4/2000 | Ference et al. | |
| 6,297,724 B1 * | 10/2001 | Bryans et al. | 340/3.51 |
| 6,388,399 B1 | 5/2002 | Eckel et al. | |
| 6,392,368 B1 | 5/2002 | Deller et al. | |
| 6,487,457 B1 | 11/2002 | Hull et al. | |
| 6,519,509 B1 | 2/2003 | Nierlich et al. | |
| 6,608,453 B2 | 8/2003 | Morgan et al. | |
| 6,687,487 B1 | 2/2004 | Mosebrook et al. | |

(Continued)

FOREIGN PATENT DOCUMENTS

WO    WO 03/007665    1/2003

OTHER PUBLICATIONS

Freescale Semiconductor, Inc., Digitally Addressable Lighting Interface (DALI) Unit Using the MC68HC908KX8, Designer Reference Manual, 162 pages, Mar. 2002.*

(Continued)

*Primary Examiner* — Frank Duong
(74) *Attorney, Agent, or Firm* — Ostrolenk Faber LLP

(57) ABSTRACT

A communication protocol for a lighting control system having a plurality of control devices coupled to a communication link uses a polling technique to coordinate the transmission of digital messages between the control devices. When the control devices are powered up, one of the control devices is established as a "master" device. During normal operation, the master device transmits a standard poll message to each of the control devices in succession using a unique semi-permanent Poll ID for each of the control devices. The master device periodically transmits a Poll-ID-Request poll message to the control devices allow those devices that do not have a Poll ID to request a Poll ID. If a control device determines either that the master device is not transmitting poll messages to it, or that another control device has the same Poll ID, the control device drops its Poll ID and acquires another Poll ID.

12 Claims, 11 Drawing Sheets

U.S. PATENT DOCUMENTS

| | | | |
|---|---|---|---|
| 6,803,728 B2 | 10/2004 | Balasubramaniam et al. | |
| 6,917,167 B2 | 7/2005 | Courtney et al. | |
| 6,927,547 B2 | 8/2005 | Walko, Jr. et al. | |
| 6,983,783 B2 | 1/2006 | Carmen, Jr. et al. | |
| 7,085,627 B2 | 8/2006 | Bamberger et al. | |
| 7,123,140 B1 | 10/2006 | Denes | |
| 7,126,291 B2 | 10/2006 | Kruse et al. | |
| 7,211,968 B2 | 5/2007 | Adamson et | |
| 7,219,141 B2 | 5/2007 | Bonasia et al. | |
| 7,307,542 B1 | 12/2007 | Chandler et al. | |
| 7,309,965 B2 | 12/2007 | Dowling et al. | |
| 7,394,451 B1 | 7/2008 | Patten et al. | |
| 7,548,552 B2* | 6/2009 | Shvodian et al. | 370/449 |
| 7,755,505 B2* | 7/2010 | Johnson et al. | 340/9.16 |
| 2002/0049822 A1 | 4/2002 | Burkhardt et al. | |
| 2002/0154025 A1 | 10/2002 | Ling | |
| 2003/0057886 A1 | 3/2003 | Lys et al. | |
| 2004/0002792 A1 | 1/2004 | Hoffknecht | |
| 2004/0217718 A1 | 11/2004 | Kumar et al. | |
| 2005/0280598 A1 | 12/2005 | Webb et al. | |
| 2006/0273970 A1 | 12/2006 | Mosebrook et al. | |
| 2006/0284734 A1 | 12/2006 | Newman, Jr. | |
| 2007/0061050 A1 | 3/2007 | Hoffknecht | |
| 2008/0055073 A1* | 3/2008 | Raneri et al. | 340/539.13 |
| 2008/0125057 A1 | 5/2008 | Nass et al. | |
| 2008/0192767 A1 | 8/2008 | Howe et al. | |
| 2009/0273433 A1* | 11/2009 | Rigatti et al. | 340/3.5 |

OTHER PUBLICATIONS

International Preliminary Report on Patentability dated Feb. 8, 2012 issued in corresponding PCT International Application No. PCT/US08/00975.

* cited by examiner

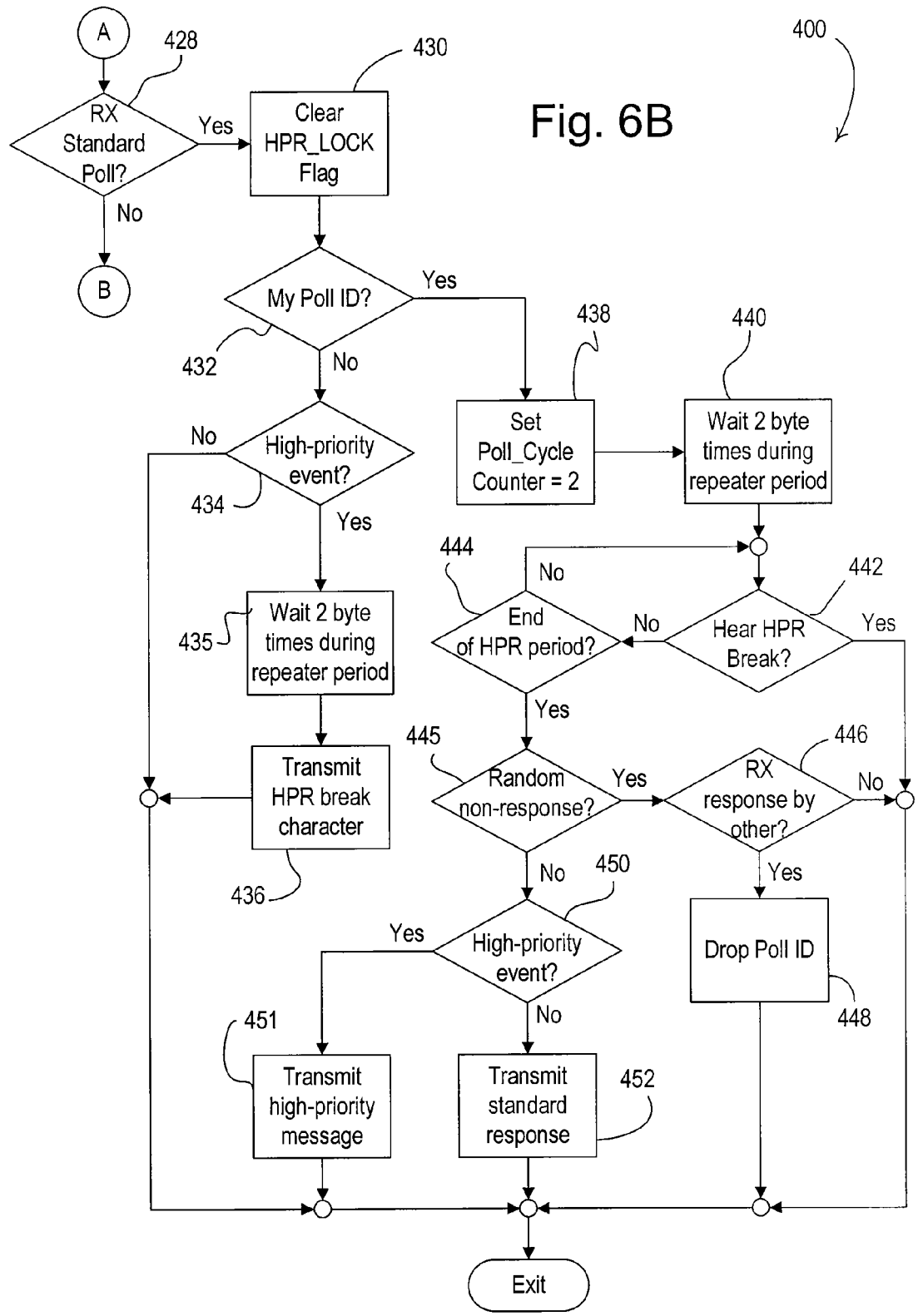

COMMUNICATION PROTOCOL FOR A LIGHTING CONTROL SYSTEM

BACKGROUND OF THE INVENTION

1. Field of the Invention

The present invention relates to a load control system having a plurality of control devices and operable to control the amount of power delivered to a plurality of electrical loads from an AC power source, and more particularly, to a novel communication protocol for allowing the control devices of the load control system to communicate with each other.

2. Description of the Related Art

Typical load control systems are operable to control the amount of power delivered to an electrical load, such as a lighting load or a motor load, from an alternating-current (AC) power source. A load control system generally comprises a plurality of control devices coupled to a communication link to allow for communication between the control devices. The control devices of a lighting control system include load control devices operable to control the amount of power delivered to the loads in response to digital messages received across the communication link, or in response to local inputs, such as user actuations of a button. Further, the control devices of a lighting control system often include one or more keypad controllers that transmit commands across the communication link in order to control the loads coupled to the load control devices. An example of a lighting control system is described in greater detail in commonly-assigned U.S. Pat. No. 6,803,728, issued Oct. 12, 2004, entitled SYSTEM FOR CONTROL OF DEVICES, which is incorporated herein by reference in its entirety.

To communicate with each other, the control devices of prior art lighting control systems have each included a unique device address. The device addresses facilitate the programming of the lighting control system, for example, such that a load control device is responsive to an actuation of a button of a keypad. In some prior art lighting control systems, the control devices each comprised a dual-inline package (DIP) switch for manually determining the device address of the control device. The process of setting a DIP switch in order to assign an address to a control device can be difficult and challenging. Accordingly, the control devices of the prior art lighting control systems were often assigned incorrectly, leading to communication errors. Therefore, some prior art lighting control systems have executed "soft addressing" procedures in which one of the control devices assigns the unique device addresses one-by-one to each of the control devices.

Many prior art lighting control systems use polling techniques to allow the control devices to communicate with each other. In order to execute the polling technique, one control device of the lighting control system must first establish itself as a "master" device. Then, the master device is operable to sequentially transmit poll messages to and receive responses from each of the other control devices in the control system. The response to the poll message may comprise an event to report (e.g., the actuation of a button on a keypad or another high-priority event) or simply a status update message.

Therefore, there exists a need for a robust communication protocol that uses a polling technique and a low enough baud rate to provide for a free-wiring scheme, while still allowing special events to be executed in a timely manner.

SUMMARY OF THE INVENTION

According to the present invention, a method of polling a plurality of control devices by a master device selected from said plurality of control devices, each coupled to a communication link and including a unique Poll ID, comprises the steps of: (1) the master device sequentially transmitting a poll message to each control device marked active in a list of Poll IDs; (2) each of the control devices responding to the poll message when the Poll ID of the device matches the Poll ID of the poll message; (3) the master device periodically transmitting a Poll-ID-Request poll message to the plurality of control devices; and (4) each of the control devices responding to the Poll-ID-Request poll message if the Poll ID of the control device is not marked active in the list of Poll IDs of the master device.

According to another embodiment of the present invention, a method of communicating a digital message from a first control device to a second control device comprises the steps of: (1) the first device establishing itself as a master device; (2) the first device selecting a first Poll ID; (3) the first device transmitting a Poll-ID-request poll message; (4) the second device transmitting a break character in a predetermined time period following the first device transmitting the Poll-ID-request poll message; (5) the first device transmitting a second Poll ID to the second device in response to the break character; and (6) the first device transmitting the digital message to the second device using the second Poll ID.

The present invention further provides a method of polling a plurality of control devices on a communication link. Each of the plurality of control devices has a unique Poll ID. The method comprises the steps of: (1) transmitting a first poll message to a first control device of the plurality of control devices using the Poll ID of the first control device; (2) receiving a response to the first poll message from the first control device; (3) transmitting a Poll-ID-request poll message to the plurality of control devices; (4) receiving a break character during a predetermined time period following the Poll-ID-request poll message from a second control device; (5) executing a search routine to determine the Poll ID of the second control device; and (6) transmitting a new Poll ID to the second control device.

In addition, the present invention provides a method of acquiring a new Poll ID by a control device coupled to a communication link. The control device has an initial Poll ID. The method comprises the steps of: (1) receiving a poll message including the initial Poll ID; (2) listening for a response to the poll message transmitted on the communication link; (3) dropping the initial Poll ID if a response to the poll message is heard on the communication link; (4) receiving a Poll-ID-request poll message; (5) transmitting a break character in response to the step of receiving a Poll-ID-Request poll message; and (6) receiving the new Poll ID.

According to yet another aspect of the present invention, a method of acquiring a new Poll ID by a control device having an initial Poll ID and coupled to a communication link comprises the steps of: (1) receiving a predetermined number of sequential poll messages that do not include the initial Poll ID; (2) dropping the initial Poll ID in response to the step of receiving a predetermined number of sequential poll messages that do not include the initial Poll ID; (3) receiving a Poll-ID-Request poll message; (4) transmitting a break character in response to the step of receiving a Poll-ID-Request poll message; and (5) receiving the new Poll ID.

The present invention further provides a method of linking two lighting control systems. The method comprises the steps of: (1) providing a first communication link coupled to a first control device having a first link address; (2) providing a second communication link coupled to a second control device having a second link address, the second link address the same as the first link address; (3) coupling the first communication link to the second communication link; (4) the first control device determining that the second link address of the second control device is the same as the first link address; (5) the first control device dropping the first link address in response to the step of determining; and (6) the first control device obtaining a third link address, the third link address different than the second link address.

Other features and advantages of the present invention will become apparent from the following description of the invention that refers to the accompanying drawings.

BRIEF DESCRIPTION OF THE DRAWINGS

FIGS. 6A, 6B, 6C are flowcharts of a message processing procedure executed by each of the control devices of the load control system of FIG. 4 according to the present invention.

DETAILED DESCRIPTION OF THE INVENTION

Figure 1:
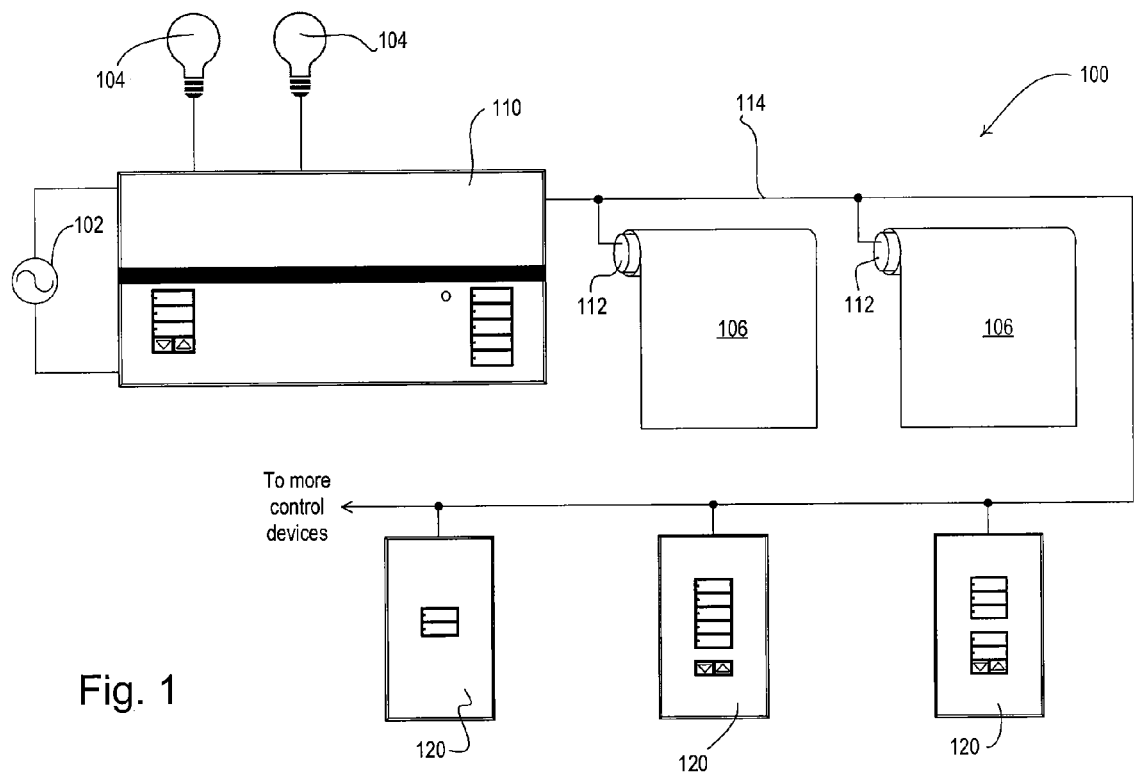
FIG. 1 is a simplified block diagram of a load control system for controlling lighting loads and motorized window treatments.

The foregoing summary, as well as the following detailed description of the preferred embodiments, is better understood when read in conjunction with the appended drawings. For the purpose of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a load control system 100 coupled to an AC power source 102 for control of a plurality of lighting loads 104 and a plurality of motorized window treatments, e.g., motorized roller shades 106. The load control system 100 comprises a multi-zone load control device 110, which comprises integral dimmer circuits for controlling the intensities of the lighting loads 104. Each of the motorized roller shades 106 comprises an electronic drive unit (EDU) 112, which is preferably located inside the roller tube of the roller shade. An example of an electronic drive unit 112 is described in greater detail in commonly-assigned U.S. Pat. No. 6,983,783, issued Jun. 11, 2006, entitled MOTOR-IZED SHADE CONTROL SYSTEM, the entire disclosure of which is hereby incorporated by reference. The load control system 100 further comprises a plurality of input devices, e.g., keypads 120, for providing inputs to the load control system (e.g., a user input such as an actuation of a button). The input devices may also comprise, for example, occupancy sensors, daylight sensors, infrared receivers, and timeclocks.

The load control device 110 is operable to communicate with the electronic drive units 112 and the keypads 120 via a communication link 114 using a novel communication protocol according to the present invention. The communication link 114 preferably comprises a wired four-wire RS-485 communication link having a baud rate of 41.67 kbps. Each communication link 114 preferably comprises a first wire for a common connection, a second wire for providing a direct-current (DC) voltage $V_{LINK}$ (e.g., 24 $V_{DC}$) to power the control devices on the device communication link, and third and fourth wires (i.e., data wires) for carrying digital messages between the control devices. The third and fourth wires carry differential communication signals, i.e., MUX and MUX-BAR signals, according to the RS-485 protocol.

The load control device 110 and the electronic drive units 112 are responsive to digital messages received from the plurality of keypads 120. A user is able to adjust the intensities of the lighting loads 104 or to select a lighting preset of the load control device 110 using the keypads 120. The user is also able to open or close the motorized roller shades 106, adjust the position of the shade fabric of the roller shades, or set the roller shades to preset shade positions using the keypads 120.

Figure 2:
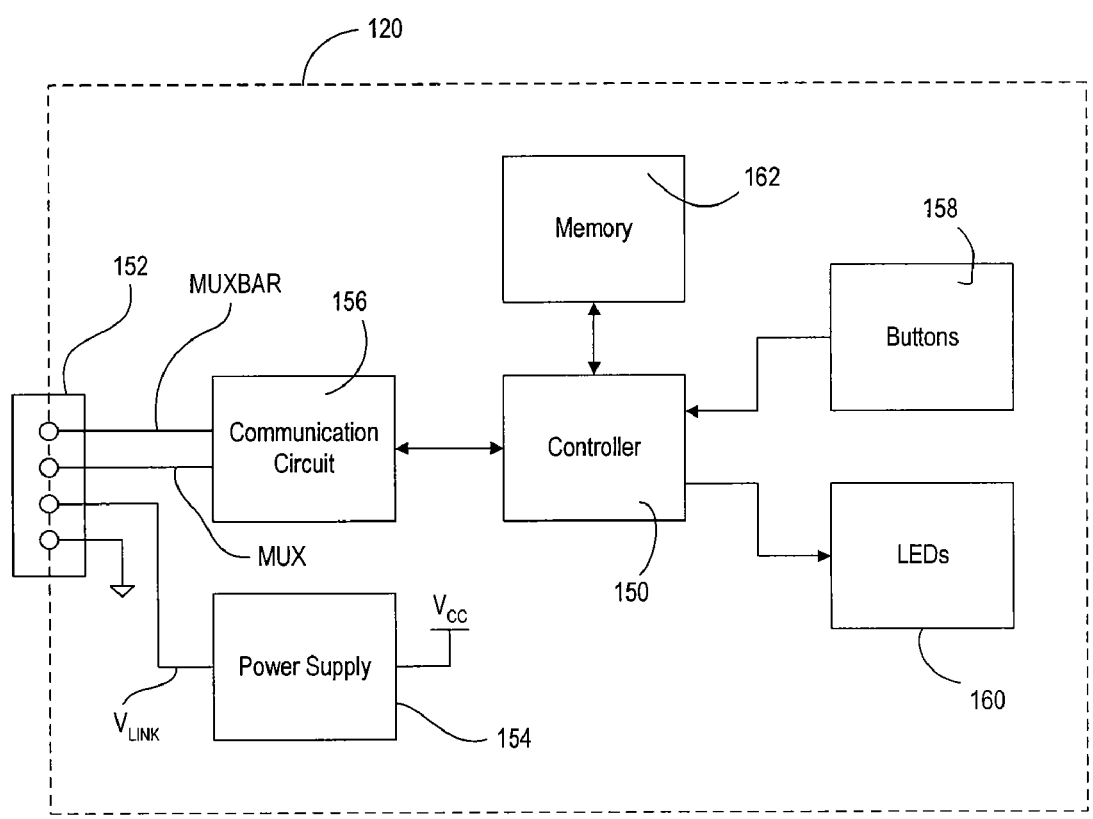
FIG. 2 is a simplified block diagram of a keypad of the load control system of FIG. 1.

FIG. 2 is a simplified block diagram of one of the keypads 120. The keypad 120 comprises a controller 150, which is preferably implemented as a microprocessor, but may be any suitable processing device, such as, for example, a microcontroller, a programmable logic device (PLD), or an application specific integrated circuit (ASIC). The keypad 120 is coupled to the four-wire communication link 114 via a four-position connector 152. A power supply 154 receives the DC voltage $V_{LINK}$ of the communication link 114 via the connector 152 and generates an internal DC voltage $V_{CC}$ (e.g., 5 $V_{DC}$) for powering the controller 150 and other low-voltage circuitry of the keypad 120.

A communication circuit 156, e.g., an RS-485 transceiver, is coupled to the data wires MUX and MUXBAR of the communication link 114. The controller 150 is coupled to the communication circuit 156, such that the controller 150 is operable to transmit and receive digital messages via the communication link 114. The controller 150 also receives inputs from a plurality of buttons 158, and controls a plurality of visual indicators, e.g., LEDs 160. The controller 150 is coupled to a memory 162 for storage of the configuration information of the keypad 120.

The load control device 110 and the electronic drive units 112 have similar structures to the keypads 120. In addition to the functional blocks shown in FIG. 2, the load control device 110 includes a plurality of load control circuits, such as dimmer circuits, for control of the amount of power delivered to the lighting loads 104. Further, the load control device 110 may comprise an additional power supply for generating the DC voltage $V_{LINK}$ for powering the control devices coupled to the communication link 114. The electronic drive units 112 also include motors, H-bridge circuits for driving the motors, and Hall-effect sensors for determining the positions of the shade fabrics as described in the '783 patent. The structures of the load control device 110 and the electronic drive units 112 are well known to those skilled in the art and are not described in greater detail herein.

Figure 4:
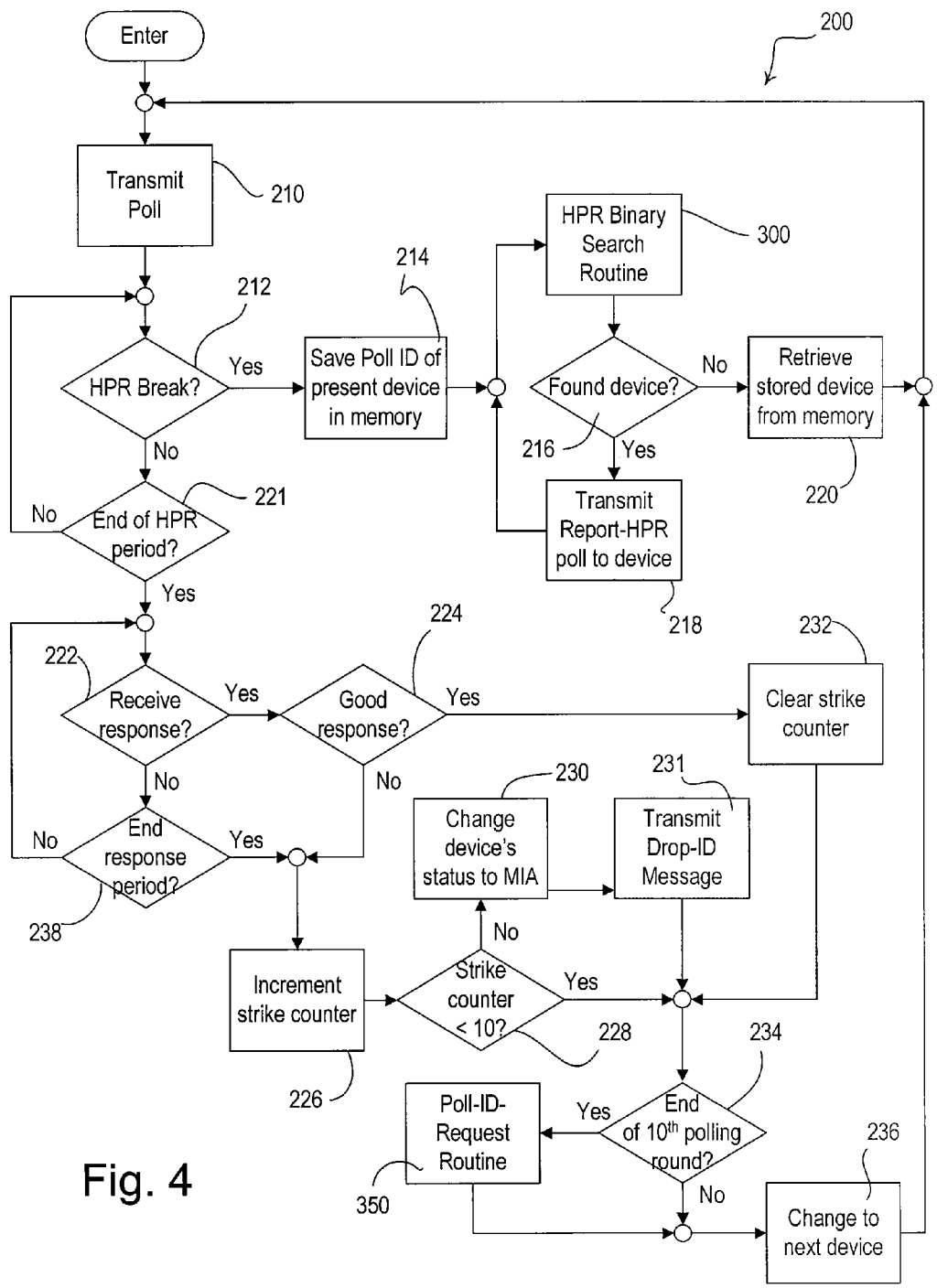
FIG. 4 is a flowchart of a master polling procedure executed by the master device of the load control system of FIG. 1 according to the present invention.

The control devices, i.e., the load control device 110, the electronic drive units 112, and the keypads 120, communicate with each other in accordance with the protocol of the present invention using a polling procedure 200 (as shown in FIG. 4). Specifically, one of the control devices is established as a "master" device each time all of the devices on the communication link 114 are powered up. During normal polling of the control devices (i.e., in a normal mode of operation), the master device transmits a standard poll message to each of the control devices present on the communication link 114 in succession. All control devices, including the master device, operate as "slave" devices to receive the standard poll messages and respond accordingly. When a slave device receives a standard poll message, the slave device is operable to respond with either a "Here" message or a "Status" message. The master device is further operable to transmit non-standard messages, for example, in the occurrence of a high-priority event at one of the slave devices, as will be described in greater detail below.

The control devices do not include DIP switches for setting the addresses, functionalities, and configurations of the control devices. Preferably, each of the control devices has a unique 32-bit serial number, which is permanently assigned to the device during manufacture. The serial number is used to determine the programming of the lighting control system 100. For example, if one of the keypads is associated with the lighting control device 110, the lighting control device stores the serial number of the keypad in memory. Typical programming methods of lighting control systems are described in greater detail in the '783 patent.

Since the serial numbers are rather large numbers, the master device does not include the serial number of the slave device to which the poll message is directed with each transmitted poll message. According to the present invention, the master device transmits the poll messages to the slave devices on the communication link 114 using unique semi-permanent single-byte Poll IDs (i.e., unique link addresses). The serial number is used to determine the Poll ID of each control device, such that each control device on the communication link 114 has a different Poll ID. Preferably, the control devices store the Poll ID in the memory 162. The master device periodically broadcasts a Poll-ID-Request poll message (i.e., a non-standard poll message) to allow those slave devices on the communication link 114 that do not have a Poll ID to request a Poll ID.

The master device maintains a list of control devices present on the link and transmits poll messages to only those devices. If the master device is not transmitting standard poll messages to a specific slave device, the slave device is operable to drop its Poll ID and then request a new Poll ID. In response to the request for a new Poll ID, the master device determines the serial number of the control device and transmits a new Poll ID to the control device. The master device then has the new Poll ID stored in the list of control devices and accordingly begins transmitting poll messages to the control device. Also, a control device on the communication link 114 is operable to determine that another control device has the same Poll ID, to subsequently drop the Poll ID, and to acquire another Poll ID. The master device is operable to re-use those Poll IDs that control devices on the communication link 114 have dropped.

The sequential polling of each device on the communication link 114 (i.e., the normal mode of operation) may be suspended if any of the control devices has a high-priority message to transmit. A high-priority message may be transmitted in response to a high-priority event occurring at the control device, for example, an actuation of one of the buttons 158 of one of the keypads 120. To signal a high-priority request (HPR), each of the control devices is operable to transmit a "break character" on the communication link 114 (i.e., to "assert the link") during a predetermined HPR time period following the end of a standard poll message transmitted to any of the control devices. For example, if the communication link 114 is one in which the link is at a low potential (i.e., substantially zero volts) when the communication link is in an idle state (i.e., when no control devices are transmitting digital message), the control device may drive the communication link high for a "byte-time" to transmit a break character. A byte-time is defined herein as the amount of time required to transmit one byte of data at the operating baud rate. In response to receiving a high-priority request, the master device is operable to change the communication link 114 to a high-priority mode in which the transmissions of regular-priority messages are suspended. Regular-priority messages comprise, for example, a response to a standard poll message and a response to a Poll-ID-Request poll message.

Multiple control devices may simultaneously transmit the break character, and thus, the transmission of break characters is considered as "wired-OR" logic. The master device is operable to determine which of the control devices transmitted the break characters and have high-priority events to report using an HPR binary search routine 300 (shown in FIG. 5A). The master device subsequently polls the control devices found by the HPR binary search routine 300 for the high-priority events. The control devices are operable to prevent a single control device from monopolizing the bandwidth of the communication link 114 (e.g., if a user is repeatedly pressing a button on a keypad). Preferably, each control device is operable to exclude itself from responding to poll messages of the HPR binary search routine 300 subsequent to reporting a high-priority event until such time as a standard poll message is once again received.

The master device and the other control devices coupled to the communication link 114 are all operable to receive the high-priority events using a message processing procedure 400 (shown in FIGS. 6A, 6B, 6C) and to appropriately respond to the high-priority events to, for example, control the lighting loads 104 and the motorized roller shades 106. After all control devices have reported the high-priority events, the master device once again begins polling the control devices normally (i.e., returns to the normal mode of operation).

Figure 3A:
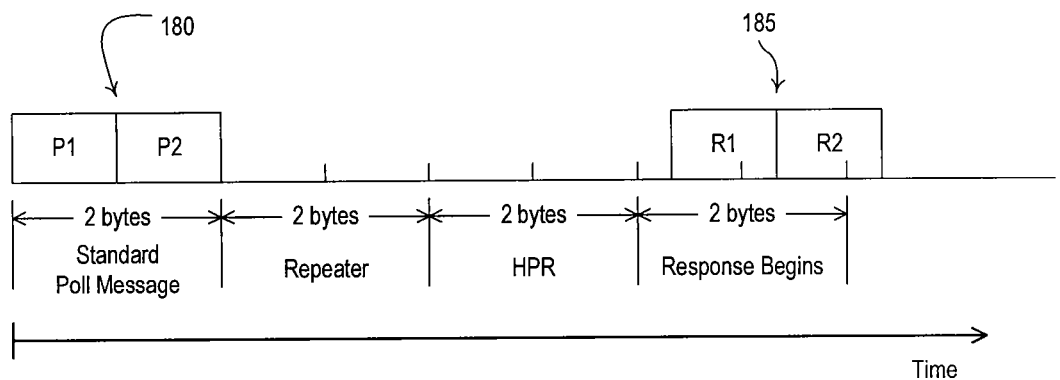
FIG. 3A is a timing diagram of a standard poll message transmitted by a master device of the load control system of FIG. 1 and a response to the standard poll message according to a novel protocol of the present invention.

FIG. 3A is a timing diagram of a standard poll message 180 transmitted by the master device and a response 185 to the standard poll message according to the novel protocol of the present invention. The standard poll message 180 preferably comprises two bytes P1, P2. The first poll byte P1 includes, for example, a standard poll message identifier and the second poll byte P2 includes the Poll ID of the control device to which the standard poll message 180 is being transmitted.

A repeater time period follows the end of the standard poll message 180 and is two byte-times in length. The length of the communication link 114 of the load control system 100 may be effectively lengthened using one or more repeater devices (not shown), which are control devices that are operable to buffer the poll messages onto additional lengths of wiring of the communication link 114. The electrical hardware of the repeater devices introduces a delay from when the repeater devices finish buffering the poll messages to when the repeater devices return the communication link 114 to the idle state. Therefore, the use of repeater devices to electrically buffer the poll messages 180 introduces some delay into when the control devices on the link are operable to begin transmitting digital messages. The repeater period after the standard poll message 180 is provided to allow for this delay, i.e., for the repeater devices to return the communication link 114 to the idle state. Repeater devices are described in greater detail in commonly-assigned U.S. Provisional Patent Application Ser. No. 60/874,166, filed Dec. 11, 2006, entitled LOAD CONTROL SYSTEM HAVING A PLURALITY OF REPEATER DEVICES, the entire disclosure of which is hereby incorporated by reference.

The HPR time period, also having a length of two byte-times, immediately follows the repeater time period. During the HPR time period, any control devices that have high-priority events to report are operable to transmit an HPR break character on the communication link 114. If an HPR break character is transmitted, the polled control device does not respond to the standard poll message 180. Therefore, the control device to which the standard poll message 180 was transmitted is operable to transmit the response 185 only if no control devices transmit an HPR break character during the HPR time period.

If no control devices transmit an HPR break character during the HPR time period, the responding control device is operable to begin transmitting the response 185 beginning during a two-byte response time period. The response 185 has a variable length. For example, a simple "I'm Here" response may comprise only two bytes R1, R2 as shown in FIG. 3A, while a status or other response may comprise a greater number of bytes.

Figure 3B:
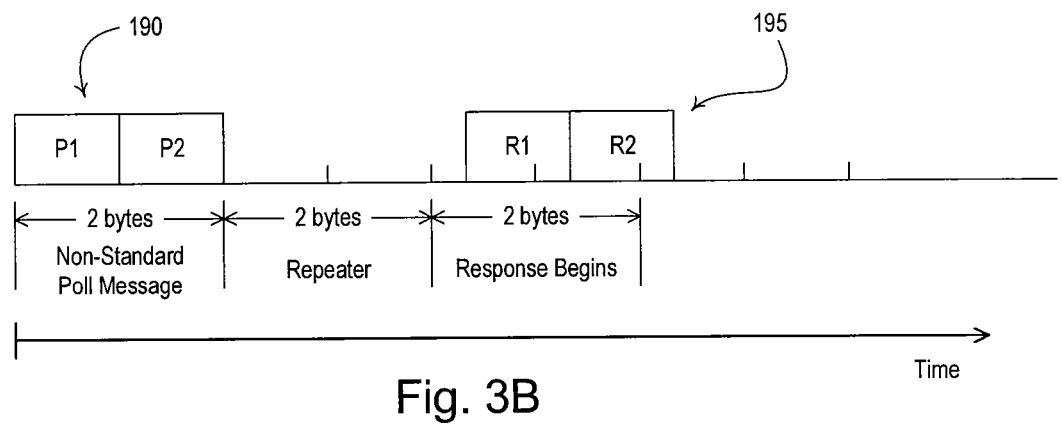
FIG. 3B is a timing diagram of a non-standard poll message transmitted by the master device of the load control system of FIG. 1 and a response to the non-standard poll message according to the novel protocol of the present invention.

FIG. 3B is a timing diagram of a non-standard poll message 190 transmitted by the master device and a response 195 to the non-standard poll message according to the novel protocol of the present invention. For example, the non-standard poll message 190 may be transmitted from the master device to a control device to allow the control device to transmit a high-priority message or to request a Poll ID. The non-standard poll message may comprise two bytes (as shown in FIG. 3B) or greater than two bytes (e.g., if the non-standard poll message includes the serial number of the control device to which the poll message is being transmitted). There is a repeater period between when the non-standard poll message 190 ends and the control device is operable to begin transmitting the response 195. There is no HPR time period. Because there is no HPR time period following the non-standard poll message 190, the control devices are not able to transmit an HPR break character to report a high-priority event after a non-standard poll message. In other words, no control device can prevent the transmission of a response to a non-standard poll message.

FIG. 4 is a flowchart of a polling procedure 200, which is executed by the controller 150 of the master device of the communication link 114. To begin, the master device transmits a poll message to the present slave device at step 210. For example, the first time that step 210 is executed, the master device transmits the poll message to the first control device, i.e., the control device having the Poll ID of zero. If the master device detects at step 212 that a control device has transmitted an HPR break character during the predetermined HPR time period to indicate that the control device has a high-priority message to transmit, the master device saves the Poll ID of the present control device (to which the poll message was transmitted at step 210) in the memory 162 at step 214.

Figure 5A:
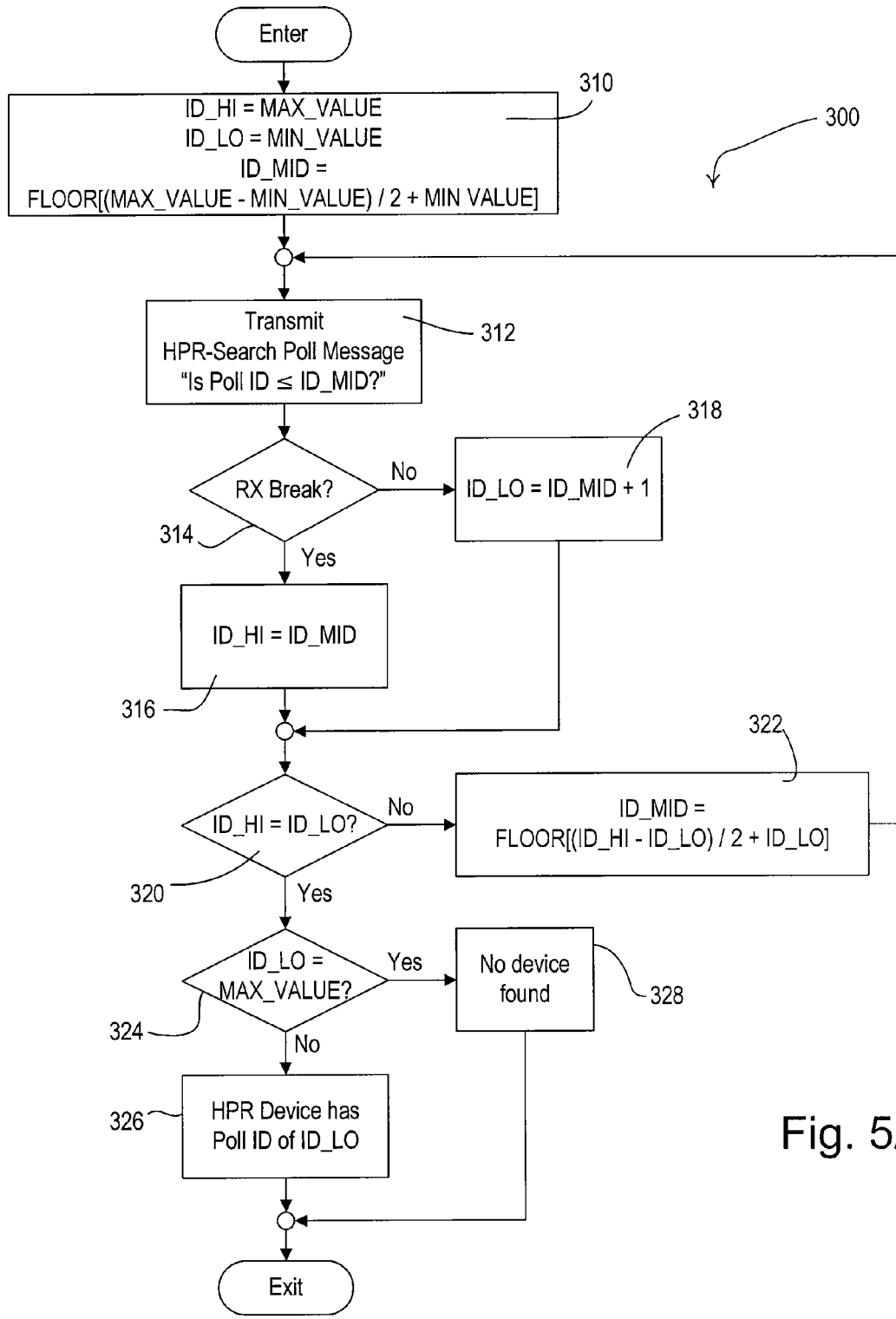
FIG. 5A is a flowchart of a high-priority request (HPR) binary search routine called by the polling procedure of FIG. 4.

Next, the master device determines the Poll ID of the control devices that transmitted the HPR break characters using the HPR binary search routine 300. FIG. 5A is a flowchart of the HPR binary search routine 300. The controller 150 is operable to search for the Poll ID from a minimum search value MIN_VALUE to a maximum search value MAX_VALUE. The binary search routine 300 repeatedly narrows the searching range (which ranges from the minimum range value ID_LO to the maximum range value ID_HI) until the minimum range value ID_LO equals the maximum range value ID_HI. A range midpoint value ID_MID represents the midpoint of the search range. When the HPR binary search routine 300 is called, the master device searches across the range of valid Poll IDs. Since the communication link 114 may have, for example, up to 100 control devices, the HPR binary search routine 300 uses a value of zero (0) for the minimum search value MIN_VALUE and a value of 100 for the maximum search value MAX_VALUE. The maximum search value MAX_VALUE is one more than the maximum possible Poll ID (i.e., a Poll ID of 99). The controller 150 is operable to determine that no control devices are left to be found by the HPR search routine 300 or that the HPR break character was transmitted by mistake if the value 100 is found by the HPR search routine.

At step 310, the controller 150 initializes the values of the minimum range value ID_LO to the minimum search value MIN_VALUE, the maximum range value ID_HI to the maximum search value MAX_VALUE, and the midpoint value ID_MID to the midpoint of the search range, i.e., $$\mathrm{ID\_MID}=\mathrm{FLOOR}[(\mathrm{MAX\_VALUE}-\mathrm{MIN\_VALUE})/2+\mathrm{MAX\_VALUE}]. \quad \text{(Equation 1)}$$

The function FLOOR returns the next lowest integer (i.e., rounds down), e.g., FLOOR(4.5)=4. At step 312, the master device transmits an HPR-Search poll message to the control devices on the communication link 114. The HPR-Search poll message is a non-standard poll message (as shown in FIG. 3B), which essentially asks of the receiving control devices "Is your Poll ID less than or equal to the midpoint value ID_MID?" In response to the HPR-Search poll message, the control devices that have a high-priority event to report and have a Poll ID less than or equal to the midpoint value ID_MID transmit a search break character. If the master device receives a search break character at step 314, there is a control device having a high priority event that has a Poll ID less than or equal to the midpoint value ID_MID, so the search range is narrowed by setting maximum range value ID_HI to the midpoint value ID_MID at step 316. If there is no response to the HPR-Search poll message (i.e., no search break character is transmitted), the minimum range value ID_LO is set equal to the midpoint value ID_MID plus one at step 318 to narrow the search range.

If the maximum range value ID_HI is not equal to the minimum range value ID_LO at step 320, the search is not complete. The midpoint value ID_MID is set equal to the midpoint of the new search range, i.e., $$\mathrm{ID\_MID}=\mathrm{FLOOR}[(\mathrm{ID\_HI}-\mathrm{ID\_LO})/2+\mathrm{ID\_LO}], \quad \text{(Equation 2)}$$

at step 322 and the HPR binary search routine 300 loops to transmit another HPR-Search poll message to the narrowed range of the control devices at step 312. If the maximum range value ID_HI is equal to the minimum range value ID_LO at step 320 (i.e., the search is complete) and the minimum range value ID_LO is not equal to the maximum search value MAX_VALUE at step 324, the controller 150 has found a control device that has a high-priority event to report. Accordingly, the controller 150 stores the minimum range value ID_LO in memory at step 326 since the control device having the Poll ID equal to the value of the minimum range value ID_LO has a high-priority event to report, and the HPR binary search routine 300 exits. If the minimum range value ID_LO is equal to the maximum search value MAX_VALUE at step 324, the controller 150 determines that no device was found by the HPR binary search routine 300 at step 328. Even though a binary search is preferably used by the polling procedure 200 to locate the control devices that transmitted HPR break characters, those skilled in the art will appreciate that other searching procedures could be used to locate the control devices.

Referring back to FIG. 4, if the master device has found a control device that has a high-priority event to report at step 216 using the HPR binary search routine 300, the master device transmits a Report-HPR poll message (i.e., a non-standard poll message) to the located control device at step 218. Accordingly, the found control device transmits the high-priority event in response to the Report-HPR poll message. The polling procedure 200 continues to search for control devices having high-priority events to report by executing the HPR binary search routine 300 and subsequently transmitting Report-HPR poll messages to the found control devices at step 218 until the HPR binary search routine 300 finds no more devices having a high-priority event to report at step 216.

In order to prevent a single control device from monopolizing the bandwidth of the communication link 114 (e.g., if a user is repeatedly pressing a button on a keypad), a control device that just transmitted a high-priority message will not report a high-priority event again until normal polling continues. At that time, the control device is operable to once again transmit an HPR break character to report the high-priority event. This anti-bandwidth-monopolization provision of the protocol is described in greater detail with reference to the message processing procedure 400 of FIGS. 6A, 6B, and 6C.

When all control devices having high-priority events to transmit have been found, the master device resumes polling the communication link 114 with the Poll ID of the slave device that the poll message transmitted to before processing the high-priority request. Specifically, at step 220, the controller 150 retrieves the stored device from the memory (i.e., the present device that was stored in memory at step 214) and transmits a poll message to this control device at step 210.

If the master device does not detect an HPR break character at step 212 before the end of the HPR period at step 221, a determination is made at step 222 as to whether the master device has received a response to the poll message that was transmitted at step 210. If so, the master device determines whether the response is a "good response" at step 224, i.e., the master device determines whether the received message has a correct message length and a valid checksum. If a specific control device transmits a predetermined number of consecutive, incoherent messages to the master device (e.g., ten incoherent messages), the master device changes the status of the device to "missing-in-action" (MIA), i.e., ceases to transmit polling messages to the control device during the polling procedure 200. Specifically, if the response is not a good response at step 224, the master device increments a strike counter for the control device at step 226. The master device maintains a unique strike counter for each slave device on the communication link 114. If the strike counter for the present control device has exceeded the predetermined number, e.g., ten, at step 228, the master device changes the status of the control device to MIA at step 230 and transmits a Drop-ID message at step 231 to the control device that is missing-in-action. If a control device receives the Drop-ID message and has the Drop-ID message included in the Poll ID, the control device drops the present Poll ID and is thus ready to request and receive a new Poll ID. If the master device determines that the response is a good response at step 224, the master device clears the strike counter for the control device at step 232.

Figure 5B:
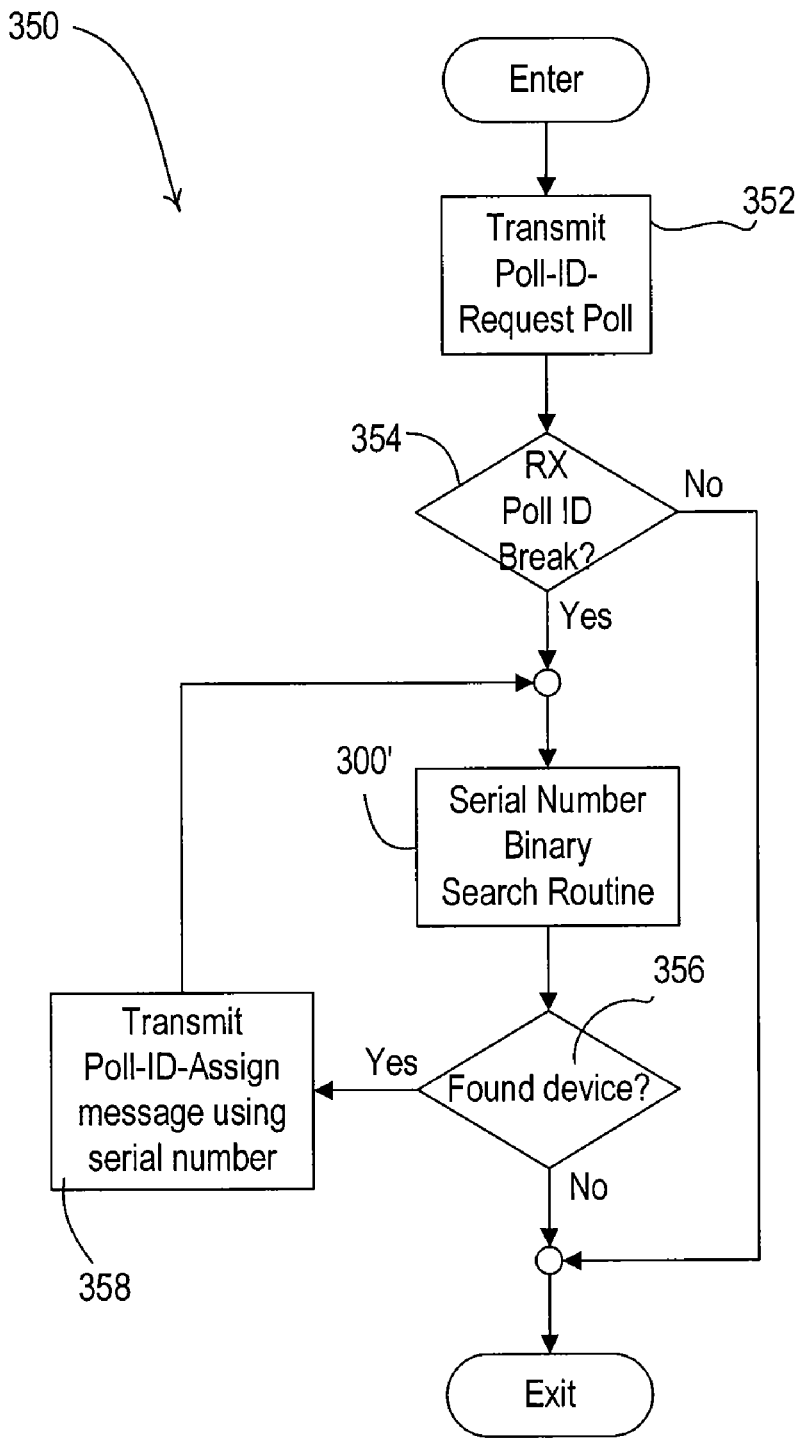
FIG. 5B is a flowchart of a Poll-ID-request routine called by the polling procedure of FIG. 4.

The master device periodically, e.g., every ten polling rounds, allows any control devices that do not have a Poll ID to request a Poll ID. If the master device has polled all devices ten times at step 234, the master device executes a Poll-ID-Request routine 350, which is shown in FIG. 5B. To begin, the master device broadcasts a Poll-ID-Request poll message to all control devices coupled to the communication link 114 at step 352. A control device that does not have a Poll ID responds to the Poll-ID-Request poll message by transmitting a Poll ID break character during the response time following the Poll-ID-Request poll message.

Figure 5C:
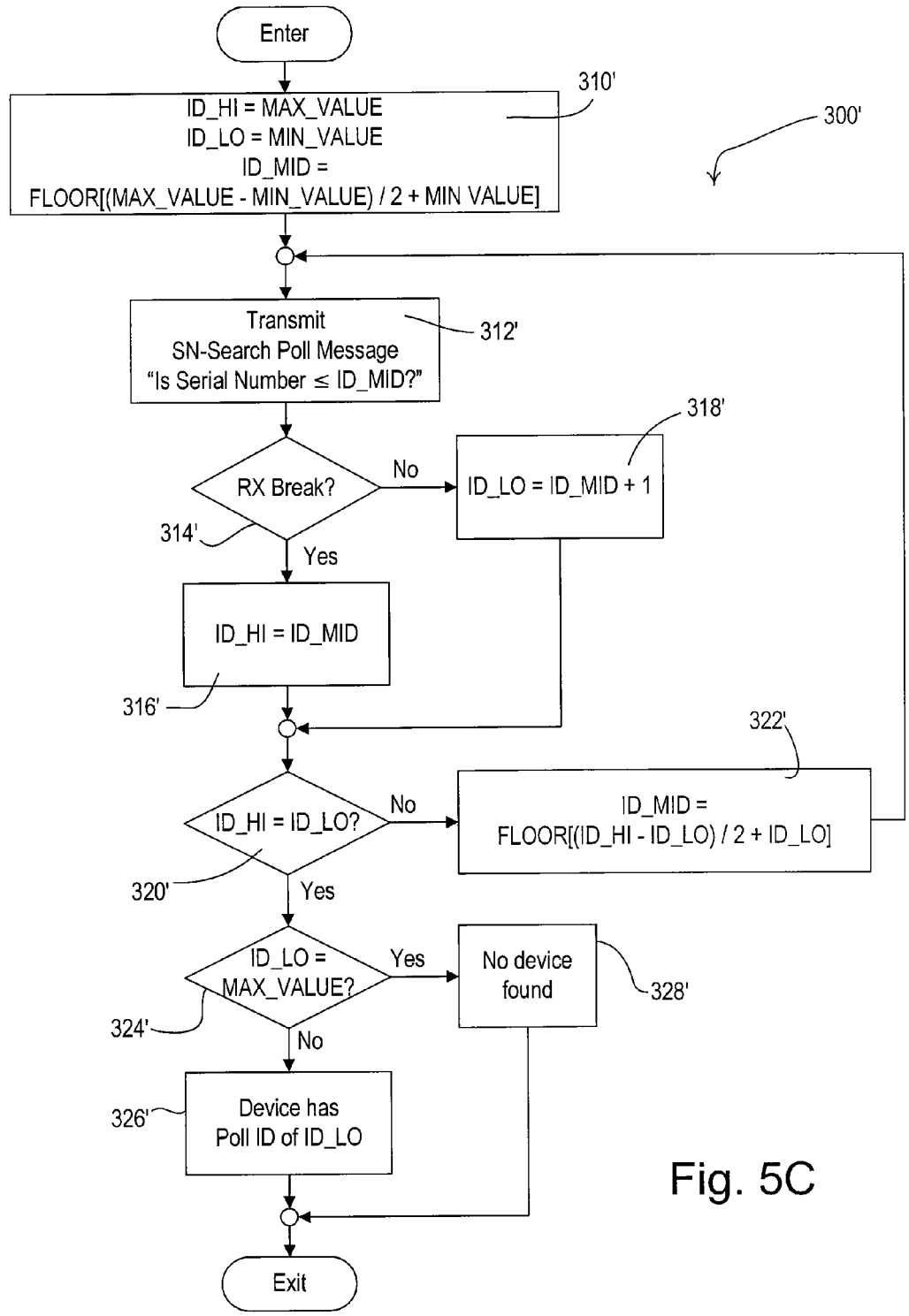
FIG. 5C is a flowchart of a Poll ID binary search routine called by the Poll-ID-request routine of FIG. 5B.

If the master device receives a Poll ID break character at step 354, the master device executes a serial number binary search routine 300' to determine the control device(s) that require a Poll ID. The serial number binary search routine 300' is shown in FIG. 5C and is very similar to the HPR binary search routine 300 of FIG. 5A. However, when the serial number binary search routine 300' is called, i.e., for the purpose of assigning a control device a Poll ID, the master device searches for the serial numbers of the control devices that do not have a Poll ID. Therefore, the minimum search value MIN_VALUE has a value of zero (0) and the maximum search value MAX_VALUE has a value of $2^{32}$, since the serial numbers have 32 bits. Further, at step 312' of the serial number binary search routine 300', the master device transmits a Serial-Number-Search ("SN-search") poll message, which is a non-standard poll message containing the message "Is your serial number less than the midpoint value ID_MID?" Since the serial numbers are longer than the one-byte Poll IDs and therefore the search domain is larger, the serial number binary search routine 300' typically requires a greater amount of time to execute than the HPR binary search routine 300.

If the master device finds a control device that requires a Poll ID at step 356, the master device transmits to the found control device at step 358 a Poll-ID-Assign message, which includes the first available Poll ID, using the serial number of the control device. The master device continues to assign Poll IDs at step 358 until the Poll ID binary search routine 300' does not locate any devices that require a Poll ID at step 356. If the master device does not receive a Poll ID break character at step 354 or if the master device does not find any more control devices that require a Poll ID at step 356, the Poll-ID-request routine 350 exits.

Referring back to FIG. 4, after executing the Poll-ID-request routine 350, the master device then switches to the next device at step 236 and transmits a poll message to this device at step 210. If the master device is not at the end of the $10^{th}$ polling round at step 234, the master device simply changes to the next device at step 236 and transmits another poll message at step 210. If the master device does not receive at step 222 a response to the poll message that was transmitted at step 210, the master device listens for a response until the end of the response period at step 238, at which time the master device increments the strike counter for the control device that did not respond at step 226.

Figure 6A:
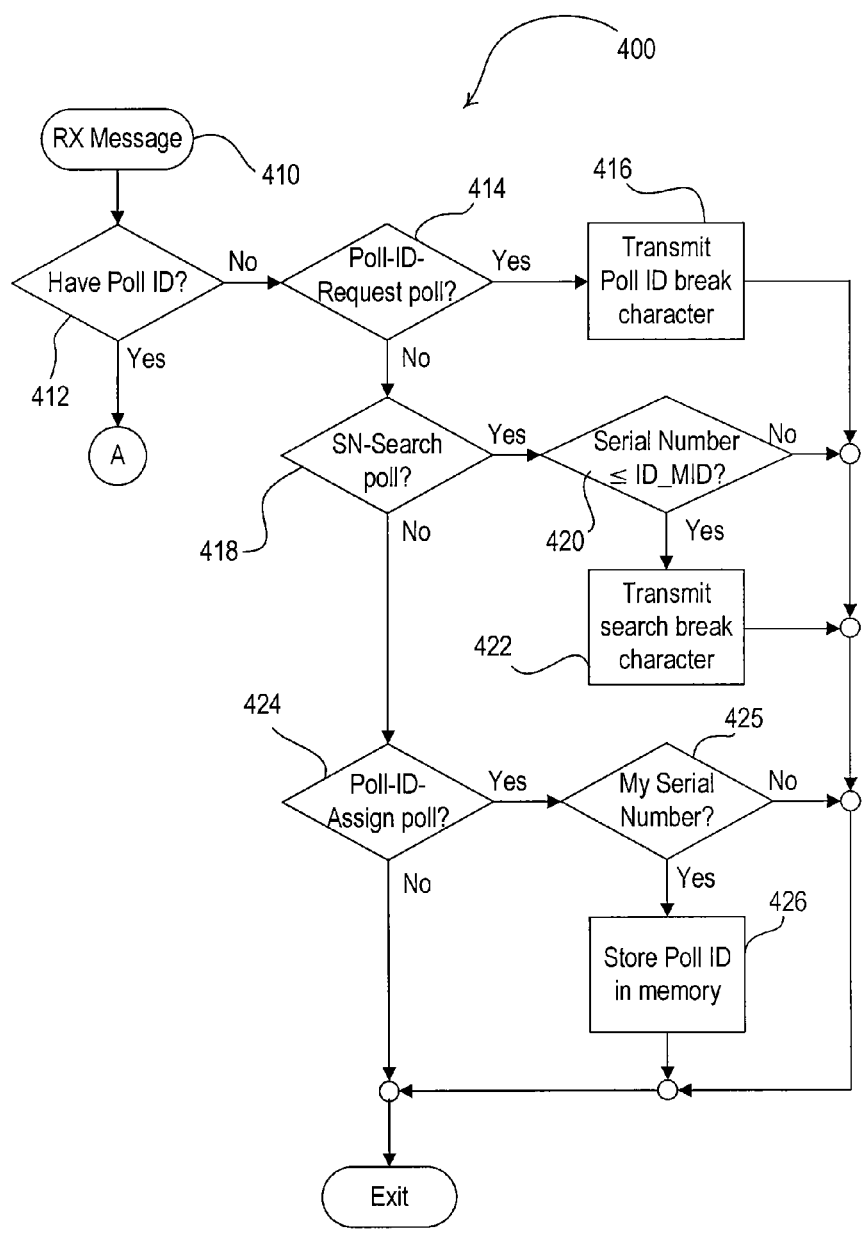
Figure 6C:
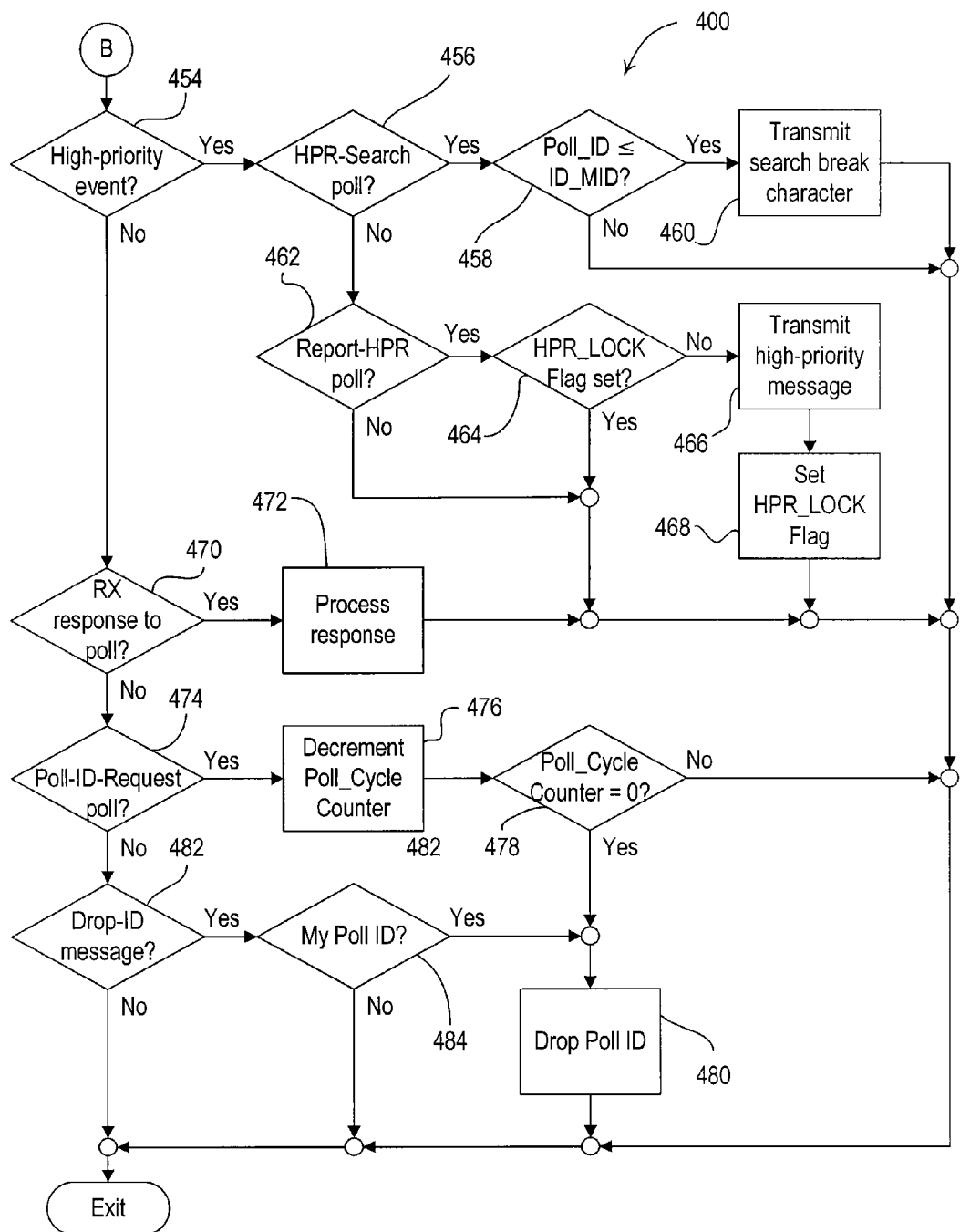

FIGS. 6A, 6B, and 6C are flowcharts of the message processing procedure 400 according to the present invention. The message processing procedure 400 is executed by the controller 150 of each of the control devices on the communication link 114 (including the master device) each time a message is received at step 410. Referring to FIG. 6A, if the control device does not have a Poll ID at step 412, the control device operates to acquire a new Poll ID from the master device. If the control device receives at step 414 a Poll-ID-Request poll message transmitted by the master device, the control device transmits a Poll ID break character on the communication link 114 at step 416 in a predetermined time period following the end of the Poll-ID-Request poll message.

Since multiple control devices may have transmitted a Poll ID break character at step 416, the master device executes the serial number binary search routine 300' to locate the control devices that require a Poll ID. If the control device has received an SN-Search poll message at step 418, a determination is made at step 420 as to whether the serial number of the control device is less than or equal to the midpoint value ID_MID. If not, the procedure 400 simply exits. Otherwise, the control device transmits a search break character at step 422 and the procedure 400 exits. The master device uses the transmission of the search break character at step 422 to narrow the searching range of the serial number binary search routine 300'. When the master device narrows the search to one control device, the master device transmits a Poll-ID-Assign poll message to the found control device. If the control device receives a Poll-ID-Assign poll message at step 424 and the serial number contained in the Poll-ID-Assign poll message is the serial number of the control device at step 425, the control device stores the Poll ID included in the poll message in memory at step 426 and the procedure 400 exits. If the control device does not receive a Poll-ID-Assign poll message at step 424 or if the serial number contained in the Poll-ID-Assign poll message is not the serial number of the control device at step 425, the procedure 400 simply exits.

Referring to FIG. 6B, if the control device has a Poll ID at step 412, a determination is made as to whether the control device has received a standard poll message at step 428. The control device uses an HPR_LOCK flag to keep track of whether the control device has reported a high-priority event since the last standard poll message that was received. The use of the HPR_LOCK flag prevents the control device from monopolizing the bandwidth of the communication link 114 if the control device has more than one high-priority event to report. If the control device has received a standard poll message at step 428, the control device clears the HPR_LOCK flag at step 430.

If the received poll message does not include the Poll ID of the polled control device at step 432, a determination is made at step 434 as to whether the control device has a high-priority event to report. If the control device was not polled at step 432 and has a high-priority event to report at step 434, the control device waits at step 435 for two-byte times after the end of the received standard poll message, i.e., until the start of the HPR time period. During the HPR time period, the control device transmits an HPR break character on the communication link 114 at step 436. Alternatively, if the received poll message includes the Poll ID of the control device and the control device has a high-priority event to report, but the control device does not receive an HPR break during the HPR time period, the control device simply transmits the high-priority message as a response to the standard poll message received at step 428 as will be described in greater detail below. Further, if the received poll message includes the Poll ID of the control device, the control device has a high-priority event to report, and the control device receives an HPR break during the HPR time period, the polled control device does not transmit the high-priority message as a response to the poll message, but instead responds to the HPR search routine 300 executed by the master control.

If the control device does not receive, for a predetermined number of received standard poll messages, a standard poll message that includes the Poll ID of the control device, i.e., the master device is not polling the control device, the control device is operable to drop the Poll ID and obtain a new Poll ID. Specifically, if the control device receives a predetermined number of Poll-ID-Request poll messages (which are transmitted after every $10^{th}$ polling round), e.g., two (2) Poll-ID-Request poll messages, the control device will drop its Poll ID. The control device uses a Poll_Cycle counter to keep track of how many Poll-ID-Request poll messages have been transmitted since the control device was last polled.

Specifically, if the received poll message includes the Poll ID of the control device at step 430, the control device sets the Poll_Cycle counter equal to two (2) at step 438 and waits for two byte-times at step 440 until the HPR time period begins. The control device listens for an HPR break character during the HPR period at step 442 until the end of the HPR period arrives at step 444. If the control device hears an HPR break character at step 442, the control device exits the procedure 400 without responding to the poll message. If the control device has a high-priority event to report at step 442, the control device subsequently joins in to the HPR search routine 300 executed by the master control.

In order to determine if any other control devices on the communication link 114 have the same Poll ID, the control device periodically listens for transmissions on the communication link rather than transmitting a response to a received standard poll message during the time period that the control device is operable to begin transmitting the response. The control device preferably chooses at random not to respond to one of the standard poll messages in the range of the $16^{th}$ through $32^{nd}$ standard poll message. If the control device does not hear an HPR break character at step 442 before the end of the HPR period at step 444, a determination is made at step 445 as to whether the control device should execute the random non-response to the standard poll message, i.e., to listen to the communication link 114 rather than responding to the standard poll message. If so, the control device listens for a response to the standard poll message from another control device at step 446. If the control device hears a response at step 446, the control device drops the present Poll ID at step 448 and eventually obtains another Poll ID through the Poll-ID-Request routine 350. If the control device should not listen on the communication link 114 at step 445 and the control device has a high-priority event to report at step 450, the control device transmits the high-priority event at step 451 and the procedure 400 exits. If the control device does not have a high-priority event to report at step 450, the control device transmits at step 452 a response to the standard poll message received at step 428.

If the control device has not received a standard poll message at step 428, the control device operates to process non-standard poll messages, i.e., responses to poll messages, HPR-Search poll messages, Link-ID-Request poll messages, etc. as shown in FIG. 6C.

In response to receiving the HPR break character transmitted at step 436, the master device executes the HPR binary search routine 300 to locate the control device(s) that have high-priority event(s) to report. Specifically, if the control device has a high-priority event to report at step 454 and if the control device receives the HPR-Search poll message at step 456, a determination is made at step 458 as to whether the Poll ID of the control device is less than or equal to the midpoint value ID_MID. If the Poll ID of the receiving control device is within the search range of the HPR binary search routine 300, the control device transmits a search break character on the communication link at step 460.

When the master device determines the Poll ID of a control device that has a high-priority event to report, the master device transmits a Report-HPR poll message to the control device. If the control device receives a Report-HPR message at step 462 and the HPR_LOCK flag is not set at step 464, the control device transmits the high-priority event to the control devices on the communication link 114 at step 466. The control device then sets the HPR_LOCK flag at step 468, such that the control device is not able to transmit another high-priority event until normal polling begins again.

If the control device does not have a high-priority event to report at step 454, but has received at step 470 a response to a standard or non-standard poll message, the control device appropriately processes the response at step 472. For example, if a user actuated a button on one of the keypads 120, the keypad 120 may transmit a high-priority message corresponding to the selection of a first lighting preset. When the control device receives the high-priority message at step 470, the control device may be responsive to the first lighting preset at step 472, e.g., the control device may illuminate an LED or control a lighting load 104 in accordance with the first lighting preset. The processing of commands of a load control system is described in greater detail in the '728 patent.

If the control device has not received a response to a standard or non-standard poll message at step 470, but the control device has received a Poll-ID-Request poll message at step 474, the controller 150 decrements the variable Poll_Cycle counter by one at step 476. If the variable Poll_Cycle counter is equal to zero at step 478, the control device drops the Poll ID at step 480. Otherwise, the procedure 400 simply exits. If the control device has not received a Poll-ID-Request poll message at step 480, a determination is made at step 482 as to whether the received message is a Drop-ID message. If the control device received a Drop-ID message at step 482 and the Drop-ID message contains the Poll ID of the polled control device, the polled control device drops the present Poll ID at step 480 and the procedure 400 exits. If the control device did not receive a Drop-ID message at step 482 or if the Drop-ID message did not contain the Poll ID of the polled control device, the procedure 400 simply exits.

Figure 7:
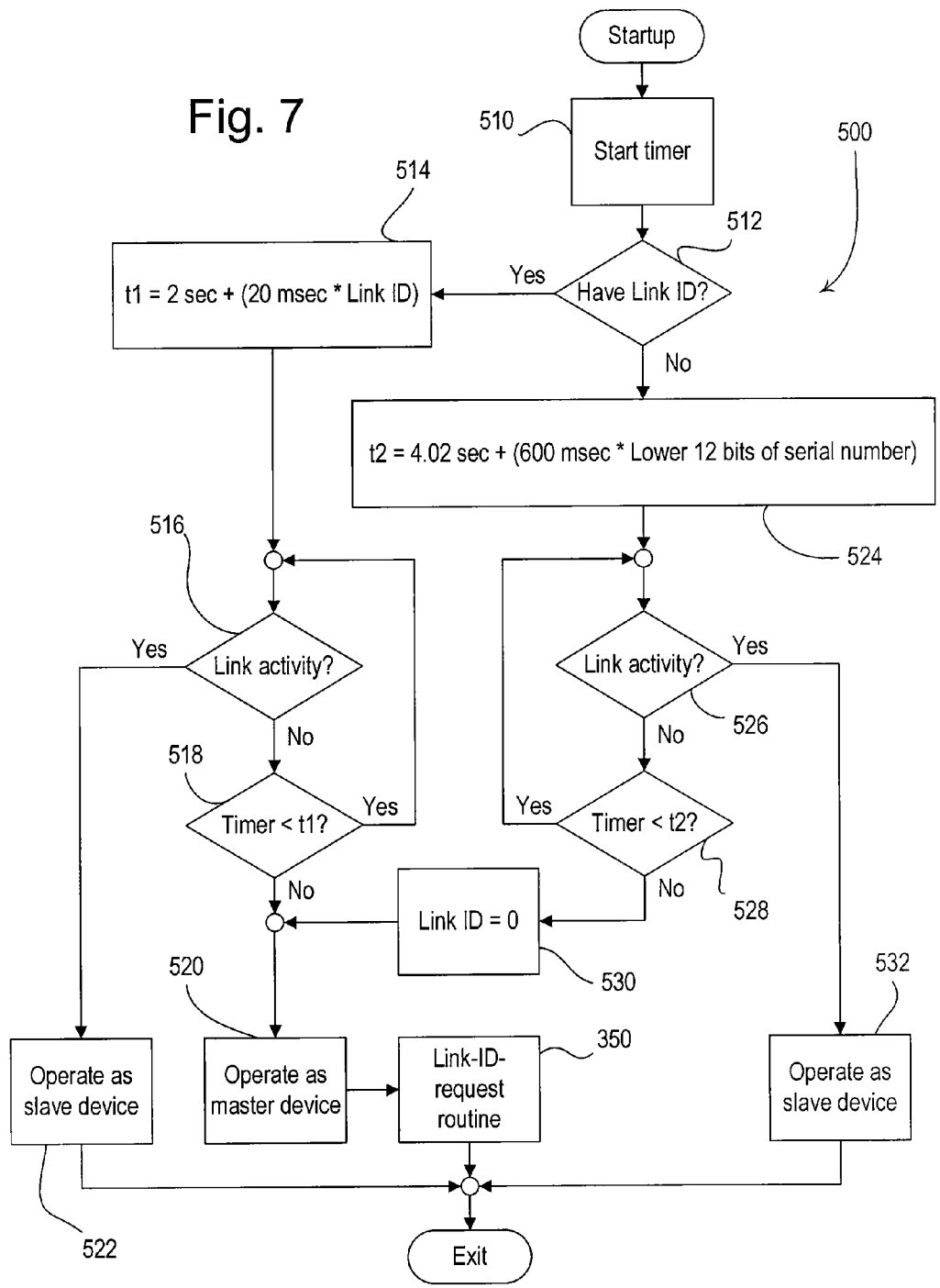
FIG. 7 is a flowchart of a startup procedure executed by each of the control devices of the load control system of FIG. 1 at startup.

FIG. 7 is a flowchart of a startup procedure 500, executed by the controller 150 of each control device at startup (i.e., power up). At step 510, the controller 150 starts a timer. If the control device has a Poll ID stored in the memory 162 at step 512, the controller 150 sets a first time $t_1$ at step 514, where $$t_1 = 2 \text{ sec} + (20 \text{ msec} \cdot \text{Poll ID}).\qquad\text{(Equation 3)}$$

Next, the control device listens for communication (i.e., link activity) on the communication link 114 at step 156 until the timer exceeds the first time $t_1$ at step 518. If the timer exceeds the first time $t_1$ at step 518, the control device begins to operate as the master device at step 520. Next, the control device executes the Poll-ID-Request routine 350 to allow other control devices on the communication link 114 to request a Poll ID, if needed. Then, the startup procedure 500 exits, at which time the control device operating as a master device begins executing the polling procedure 200. If the control device detects link activity at step 516, the control device simply operates as a slave device (i.e., not as the master device) at step 522 and the startup procedure 500 exits.

If the control device does not have a Poll ID stored in the memory 162 (or does not have a memory to store the Poll ID) at step 512, the controller sets a second time $t_2$ at step 524, such that $$t_2 = 4.02 \text{ sec} + (600 \text{ msec} \cdot SN_{LOW\text{-}12\text{-}BITS}),\qquad\text{(Equation 4)}$$

where $SN_{LOW\text{-}12\text{-}BITS}$ is the value of the lower 12 bits of the serial number of the control device. According to Equation 2, the second time $t_2$ is always greater than the first time $t_1$ to allow a control device having a Poll ID to become the master device before allowing a control device not having a Poll ID.

The control device waits until link activity is detected at step 526 or the timer exceeds the second time $t_2$ at step 528, at which time the control device sets the Poll ID as zero (0) at step 530. The control device then begins operating as the master device at step 520 and executes the Poll-ID-Request routine 350. If the control device detects communication on the communication link 114 at step 526, the control device operates as a slave device at step 532 and the startup procedure 500 exits.

The use of the semi-permanent Poll IDs to facilitate the transmission of the poll messages allows for easy combination of two or more functional lighting control systems. In some situations, it is desirable to first install and program two (or more) separate lighting control systems to obtain the desired functionality of each lighting control system, and then physically couple the two lighting control systems together at a later date to form one larger lighting control system. Before combination of the lighting control systems, each lighting control system will be configured separately such that some of the control devices of the first lighting control system have the same Poll IDs as some of the control devices of the second lighting control system.

Preferably, when the two communication links are coupled together, the lighting control systems are operable to automatically become functional without communication errors, while still maintaining the programming information of each of the lighting control systems. According to the methods of the present invention, the control devices of each of the lighting control systems are operable to automatically resolve the duplications of Poll IDs when the communication links of the lighting control systems are connected. Since the programming of the lighting control system is dependent upon the serial numbers of the control devices, the control devices are operable to change their Poll IDs with affecting the programming information.

Specifically, when the communication links are coupled together, the control devices are operable to determine that there are other control devices on the communication link having the same Poll ID (by randomly listening on the communication link rather than responding to a standard poll message) and drop that Poll ID (e.g., at steps 445, 446, and 448 of FIG. 6B). Then, the control devices that have dropped their Poll IDs are able to respond to the Poll-ID-Request poll messages transmitted by the master device to acquire a new Poll ID.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of polling a plurality of control devices by a master device selected from said plurality of control devices, each of the plurality of control devices coupled to a communication link and including a unique Poll ID, the method comprising the steps of:

the master device sequentially transmitting a standard poll message to each control device marked active in a list of Poll IDs during a normal mode of operation;

each of the control devices responding to the standard poll message when the Poll ID of the device matches the Poll ID of the standard poll message;

the master device periodically transmitting a Poll-ID-Request poll message to the plurality of control devices between two consecutive standard poll messages during the normal mode of operation; and each of the control devices responding to the Poll-ID-Request poll message if the Poll ID of the control device does not have a Poll ID.

2. The method of claim 1, further comprising the step of:
prior to the step of the master device sequentially transmitting a standard poll message, building the list of Poll IDs indicating the control devices to which standard poll messages should be transmitted, a status of each control device on the list being marked active.

3. The method of claim 2, further comprising the step of:
assigning a unique Poll ID to each of the plurality of control devices by generating each Poll ID using a unique serial number of each of the plurality of control devices.

4. The method of claim 3, further comprising the step of:
coupling a second communication link to the first communication link, the second communication link having a second plurality of control devices coupled to it.

5. The method of claim 3, wherein the serial number is permanently assigned to each of the plurality of control devices by a device manufacturer.

6. The method of claim 3, wherein the serial number is 32-bits.

7. The method of claim 1, further comprising the steps of:
the master device marking the status of a control device as missing instead of active if the control device did not respond for a predetermined number of times to the standard poll messages transmitted to the control device; and
making the Poll ID of the control device marked as missing available for re-assignment to other devices coupled to the communication link.

8. The method of claim 1, further comprising the steps of:
the master device marking the status of a control device as missing instead of active if the response from a control device is invalid a predetermined number of times; and
making the Poll ID of the control device marked as missing available for re-assignment to other devices coupled to the communication link.

9. The method of claim 1, wherein the master device transmits the Poll-ID-Request poll message to the plurality of control devices at the end of a polling round.

10. The method of claim 9, wherein the master device transmits the Poll-ID-Request poll message to the plurality of control devices at the end of every tenth polling round.

11. A method of polling a plurality of control devices by a master device selected from said plurality of control devices, each of the plurality of control devices coupled to a communication link and including a unique Poll ID, the method comprising the steps of:
the master device sequentially transmitting a poll message to each control device marked active in a list of Poll IDs;
each of the control devices responding to the poll message when the Poll ID of the device matches the Poll ID of the poll message;
the master device periodically transmitting a Poll-ID-Request poll message to the plurality of control devices;
each of the control devices responding to the Poll-ID-Request poll message if the Poll ID of the control device is not marked active in the list of Poll IDs of the master device;
assigning a unique Poll ID to each of the plurality of control devices that responded to the Poll-ID-Request;
the master device marking the status of a control device as missing instead of active if the control device did not respond for a predetermined number of times to poll messages transmitted to the control device; and
making the Poll ID of the control device marked as missing available for re-assignment to other devices coupled to the communication link.

12. A method of polling a plurality of control devices by a master device selected from said plurality of control devices, each of the plurality of control devices coupled to a communication link and including a unique Poll ID, the method comprising the steps of:
the master device sequentially transmitting a poll message to each control device marked active in a list of Poll IDs;
each of the control devices responding to the poll message when the Poll ID of the device matches the Poll ID of the poll message;
the master device periodically transmitting a Poll-ID-Request poll message to the plurality of control devices;
each of the control devices responding to the Poll-ID-Request poll message if the Poll ID of the control device is not marked active in the list of Poll IDs of the master device;
assigning a unique Poll ID to each of the plurality of control devices that responded to the Poll-ID-Request;
the master device marking the status of a control device as missing instead of active if the response from a control device is invalid a predetermined number of times; and
making the Poll ID of the control device marked as missing available for re-assignment to other devices coupled to the communication link.

\* \* \* \* \*